United States Patent [19]

Shames et al.

[11] 3,849,777

[45] Nov. 19, 1974

[54] INTERROGATOR-TRANSPONDER FRUIT REDUCER

[75] Inventors: Oscar Shames, Philadelphia; James L. Hinds, Telford; Gerald J. Palatucci, Warrington; Michael Raditz, Cornwells Heights, all of Pa.

[73] Assignee: The United States of America as represented by the Secretary of the Navy, Washington, D.C.

[22] Filed: Oct. 26, 1973

[21] Appl. No.: 409,837

[52] U.S. Cl................ 343/6.5 LC, 343/6.8 LC
[51] Int. Cl............................................. G01s 9/56
[58] Field of Search......... 343/6.5 R, 6.5 LC, 6.8 R, 343/6.8 LC

[56] References Cited
UNITED STATES PATENTS

| | | | |
|---|---|---|---|
| 3,302,197 | 1/1967 | Humpherys | 343/6.5 LC |
| 3,611,379 | 10/1971 | Deckett | 343/6.5 LC X |
| 3,715,750 | 2/1973 | Bishop | 343/6.8 LC |
| 3,803,602 | 4/1974 | Case et al. | 343/6.5 LC |

Primary Examiner—Malcolm F. Hubler
Attorney, Agent, or Firm—R. S. Sciascia; Henry Hansen

[57] ABSTRACT

In an interrogator-transponder collision avoidance system a probe selector detects the presence of two distinct signals, P or Q. Detection of a P signal at the input dictates a Q output and vice versa. Additional circuitry resolves ambiguity when P and Q appear concomitantly. In the absence of either P or Q at the input, the output is randomly chosen to be either P or Q.

7 Claims, 3 Drawing Figures

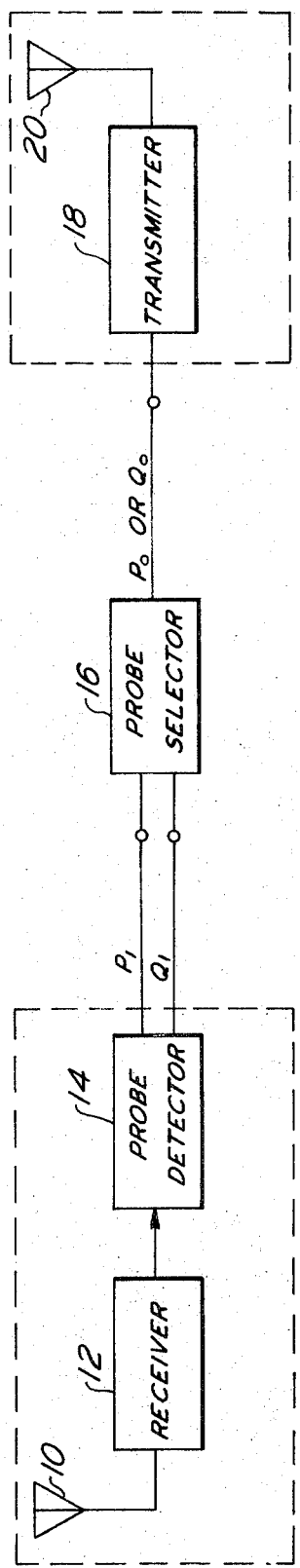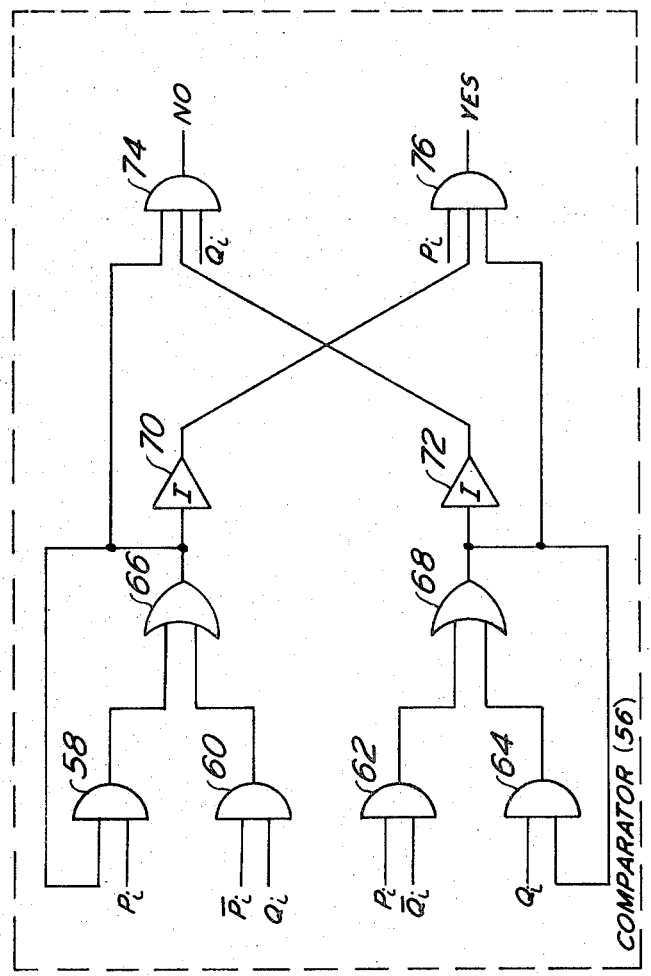

INTERROGATOR-TRANSPONDER FRUIT REDUCER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Collision avoidance systems employing interrogator-transponder (prober-remitter) techniques have been proposed as a means of preventing midair collisions. In such systems traffic handling capability is usually limited by reception of replies to interrogations other than ones own interrogations. These extraneous replies are called fruit. The general purpose of this invention is to reduce the amount of fruit in the probing aircraft's range of interest. Other than the range of interest, the fruit received by the probing aircraft is of no interest. By reducing the fruit in the range of interest to each prober, traffic handling capability is increased beyond that which would otherwise be possible.

An existing collision avoidance system, known by the acronym SECANT (Separation Control of Aircraft by Nonsynchronous Techniques), employs multiple frequencies for probes and replies and uses special correlator techniques as a means of coping with the fruit problem generated by aircraft in high traffic areas. A simplified description of that portion of SECANT which is germane to the present invention follows.

Each aircraft probes its surrounding environment on either of two randomly selected frequencies $P_o$ or $Q_o$. The prober then listens for replies. Aircraft within range of the prober reply on one of four frequencies $P_1^-$, $P_1^+$, or $Q_1^-$ or $Q_1^+$. The P-type reply is sent in answer to a P-type probe. The Q-type reply is sent in answer to a Q-type probe. The choice of the superscript ($-$ or $+$) depends on the data the replying aircraft is sending to all probers during successive 1 millisecond intervals of time. For example, ($-$) for a 0 and ($+$) for a 1 in binary form. (However, for purposes of this invention the $P-$ and the $P+$ signals are treated simply as $P_1$ signals and the $Q-$ and $Q+$ signals are treated simply as $Q_1$ signals).

After detecting and decoding the data impressed upon the received replies, a prober can measure range to its targets, range rate from successive ranges, and data including barometric altitude.

In general half of the received fruit will be P type and half will be Q type. Correlation in 500 foot range bins results in the annihilation of P type fruit by Q type fruit, leaving the targets exposed. Once a target is detected a tracking gate is assigned to measure the range and range rate. At the same time the binary bit of the reply pulse being tracked is recorded. Finally, a threat determination is made based on (Range/Range Rate) = Tau, where Tau is the time to a collision if the aircraft are on a collision course. Since each prober compares target altitude with its own altitude, an up or down escape maneuver can be indicated to the pilot.

The correlator technique used in SECANT is a powerful fruit reducer for the purpose of detecting a target. Having once detected a target and initiated a range rate and data track, the range correlator plays no further part. Now any fruit occurring in the 1 μs wide tracking gate can affect the range rate and the data. Since fruit replies vary as $(n)(n-1)$ where n is the number of aircraft other than the prober, the problem of tracking and reading data becomes a serious one in dense traffic.

SUMMARY OF THE INVENTION

For a proper understanding of this invention it is important to recognize that although fruit appears to be a random mixture of P-type and Q-type it really comes in clusters of about 100 μs following each received probe and has the same character as the probe. Thus, receipt of a P-probe from aircraft B by aircraft A can be used as a predictor to A that he is about to receive a cluster of P-type fruit. The fruit consists of the ($n-1$) P-type replies to the P-probe. If A does not interrogate within 100 μs of receipt of B's probe he need not be concerned with this fruit since it does not occur during the 90 μs following A's interrogation. Thus if it is possible for A to find a "quiet spot" in which to interrogate he will see little or no fruit following his interrogation. Some of the aircraft will be probing at a regular rate (when they are tracking) and some will be probing at a time jittered rate (when they are correlating in the process of searching for a target) and some will always be probing at a lower repetition rate which is also time jittered.

Because the fruit appears in clusters it is possible for A to find a "quiet spot" with respect to the regular rate (no probe jitter) probers, but not with respect to the jittered probers. Once A has picked a "quiet spot" in which to probe he need worry only about fruit from the random probers. The "quiet spot" selection technique is itself a fruit reducer for aircraft A in the 90 μs time interval following his interrogation. That is while there may be a high fruit rate when averaged over a one second interval, there could be a low fruit rate in the 100 μs interval of interest to A particularly in the 1 μs interval of his data tracking gate.

Having pointed out the possibility of selecting a "quiet spot" with respect to the regular probers, this invention then proceeds to remove much of the remaining fruit generated by the random probers. The basic idea is centered on a modification of the normally random selection of P or Q probe outputs. Each time a probe is received by aircraft A at a time before his own probe of, for example, 50 μs or less, A modifies his random selection to always choose the opposite type probe. If he receives a P-type probe he probes with a Q and vice versa. This simple technique eliminates all of the fruit associated with the preceding probe since it is only fruit of the same type as A's probe that is troublesome.

Further features and advantages of the invention will become more readily apparent from the following detailed description when taken in conjunction with the accompanying drawings.

BRIEF DESCRIPTION OF THE DRAWINGS

FIG. 1 is a much simplified block diagram indicating how a probe selector according to the invention cooperates with other system components;

FIG. 3 is a logic diagram of a comparator means that can be employed within the probe selector of FIG. 1.

DESCRIPTION OF THE PREFERRED EMBODIMENT

Figure 2:
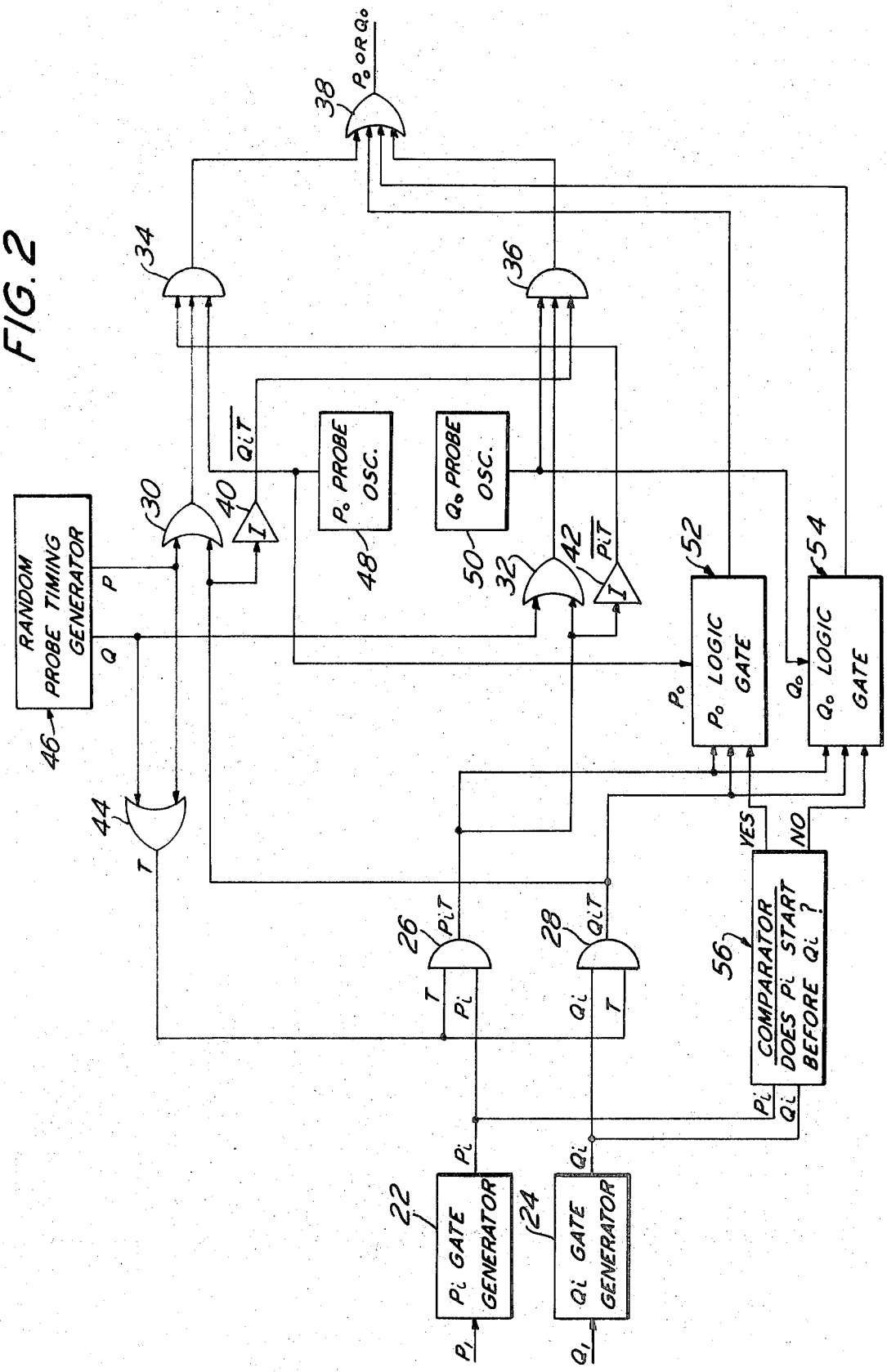
FIG. 2 is a logic diagram of the probe selector of FIG. 1.

FIG. 1 is an overall block diagram indicating how the probe selector of the present invention cooperates with an existing collision avoidance system. Through the cooperation of an antenna 10, a receiver 12, and a probe detector 14, a receiving aircraft detects the probes of other aircraft. These probes are signals on one of two frequencies which are decoded by the receiver 12 and the probe detector 14 to produce a 1 μs pulse at the output of probe detector 14. The signal $P_1$ is present if a P-type probe is decoded; the signal $Q_1$ is present if a Q-type probe is decoded. These signals are then injected into a probe selector 16 which insures that a $P_o$ signal is transmitted to other aircraft if the receiving aircraft has decoded a Q-type probe. Conversely, the probe selector 16 insures that a $Q_o$ signal is transmitted to other aircraft if the receiving aircraft has decoded a P-type probe. In the absence of either a P-type probe or a Q-type probe being received a predetermined time before the time at which the sending aircraft desires to transmit its own probe, then the P-type or Q-type probe is randomly selected by probe selector 16. The signal output of the probe selector 16 is sent via transmitter 18 and antenna 20 to surrounding aircraft. The dotted lines around the antenna, receiver, probe detector, and transmitter in FIG. 1 serve to highlight that these elements form no part of the present invention.

FIG. 2 assumes that an aircraft is probing its surrounding with either P-type or Q-type probes at 1,000 times per second with a 1 μs wide pulse when the aircraft is in the data track mode of operation. $P_1$- or $Q_1$-type probes are detected in the appropriate probe detector frequency channel at the output of the receiver 12 and probe detector 14. For each detected $P_1$- or $Q_1$-probe a 50 μs gate signal $P_i$ or $Q_i$ is generated by gate generators 22 and 24 which may be conventional single shots or monostable multivibrators. The number 50 μs is representative and could be optimized either lower or higher. The signal $P_i$ is combined in an AND gate 26 with a T pulse representing the time at which the aircraft desires to transmit a probe. $P_iT$ indicates that a $P_1$-type probe has been received within 50 μs of T. Hence through an OR gate 32 followed by an AND gate 36 with another input $\overline{Q_iT}$ (derived from inverter 40 which indicates that no Q-probe has been received), the $Q_o$-probe oscillator 50 is gated on and fed to the transmitter 18 via OR gate 38 for the 1 μs duration of T. Thus an incoming $P_1$ probe has produced a $Q_o$ outgoing probe. Alternately if a $Q_1$-probe has been decoded by receiver 12 and probe detector 14, signal $Q_i$ is combined with a T pulse in AND gate 28 to give $Q_iT$ which, through another OR gate 30 and an AND gate 34 with a $\overline{P_iT}$ input (derived from inverter 42), lets the $P_o$-probe oscillator 48 feed the transmitter 18 via OR gate 38. Thus an incoming $Q_1$ probe has produced a $P_o$ outgoing probe. If two or more $P_1$-probes arrive in the absence of a $Q_1$-probe OR if two or more $Q_1$-probes arrive in the absence of a $P_1$-probe the action is the same as described above.

The signal T is a 1 μs pulse produced by combining the Q- and P-outputs of random probe timing generator 46 in OR gate 44. The timing generator 46 is of conventional construction and is arranged to produce mutually exclusive Hi signals on the Q-and p- outputs in a time random fashion. Since the signals P and Q represent the time at which the interrogating aircraft desires to send a probe, the signal T by virtue of OR gate 44 also represents this same factor. Due to the requirement that one and only one of the two probe types be selected at any particular probe time, it is apparent that the signals P and Q may both be Lo simultaneously but that P and Q may not both be Hi simultaneously.

When both $P_i$- and $Q_i$-probes are concomitantly present during a portion of their respective pulse durations, AND gates 34 and 36, which enabled the $P_o$- or the $Q_o$-probe oscillator (48 or 50 respectively), are gated off by $\overline{P_iT}$ and $\overline{Q_iT}$. In this case an alternate path for selecting the $P_o$ or $Q_o$ probe oscillator is provided by the $P_o$ and $Q_o$ Logic Gates 52 and 54 respectively, said logic gates being conventional AND gates. The controlling element for these logic gates is the comparator 56 which receives both the $P_i$- and $Q_i$-inputs and answers the question, "does $P_i$ start before $Q_i$." If the answer is "yes," the $P_o$ Logic Gate 52 is turned on and allows the $P_o$-probe oscillator 48 to get to the transmitter 18 for a 1 μs duration. This procedure insures that the outgoing probe selection is made on the basis of being opposite to the last received incoming probe which in this case (i.e. $P_i$ starts before $Q_i$) was a Q-type. The outgoing probe was therefore P-type. Conversely if the comparators answer is "no," the $Q_o$ Logic Gate 54 is turned on allowing the $Q_o$-probe oscillator 50 to reach the transmitter 18. Thus if the last received probe is a P-type, the outgoing probe will be Q-type.

The advantage of using the last received probe as a probe selection criterion is that the fruit associated with it will be fresher, i.e., more recent and hence possibly more damaging. In the absence of any incoming probes in the 50 μs interval before the aircraft interrogates, the random probe timing generator 46 has a clear path to turn on the appropriate probe oscillator on the usual random basis that SECANT employs.

Comparator 56 may be implemented in several ways. One such embodiment is shown in FIG. 3. Operation of the logic circuit in FIG. 3 may best be illustrated by assuming reception of a $P_i$ signal slightly before a $Q_i$ signal. (In the following explanation positive logic conventions are employed).

With $P_i$ present and $Q_i$ absent the output of AND gate 58 is Lo as is the output of AND gate 60; the output of OR gate 66 is Lo thereby placing a Lo input on AND gate 58 and AND gate 74; through inverter 70 a Hi is placed on the second of the three inputs to AND gate 76; the output of AND gate 62 is Hi due to the signal $\overline{Q_i}$ while the output of AND gate 64 is Lo due to the signal $Q_i$; the output of OR gate 68 is Hi and places a Hi on the third of the three inputs of AND gate 76 while inverter 72 insures that a Lo is placed on an input of AND gate 74. At this point it is apparent that all three inputs to AND gate 74 are Lo and all three inputs to AND gate 76 are Hi. Hence the output of AND gate 76 is Hi and the YES signal is present as is required when $P_i$ occurs before $Q_i$. By using the conventions immediately set forth above it is apparent that the NO signal will be Hi and the YES signal Lo when $Q_i$ occurs before $P_i$.

From the foregoing it is apparent that fruit reduction is obtained by monitoring the probes emitted by other aircraft and choosing an outgoing probe opposite in type to the last received probe. An alternative scheme may be employed to achieve the same objective. Instead of monitoring the probes of other aircraft, the interrogating aircraft monitors the replies of the other aircraft. These extraneous replies constitute fruit to the interrogating aircraft since they are not replies to the interrogating aircraft's own probes. The extraneous replies are integrated for a short period of time prior to the time at which the interrogating aircraft desires to send its own probe. The results of the integration indicate which type of reply predominates. If the predominate type is P then the interrogating aircraft probes its surroundings with a $Q_o$-type probe and vice versa. Integration of the fruit is easily accomplished with an RC network of suitable time constant (such as 50 $\mu$s) attached to the bus which feds the range bins of the Secant Range Correlator. P-type fruit puts a positive charge or count in the range bins, while Q-type fruit puts a negative charge or count in the range bins. Hence an integrator can determine the dominant type of fruit and the integrator output signal can be employed in a probe control circuit to select an outgoing probe opposite in type to the predominant type fruit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a prober-remitter collision avoidance system employing two distinct probe signal types, $P_o$ and $Q_o$, a probe selector comprising:
   an output terminal;
   first means for detecting the presence of a signal $P_1$ and for producing a signal $P_i$;
   second means for detecting the presence of a signal $Q_1$ and for producing a signal $Q_i$;
   third means connected to the output of said first means for providing a $Q_o$-probe signal to said output terminal upon receipt of said signal $P_i$;
   fourth means connected to the output of said second means for providing a $P_o$ probe signal to said output terminal upon receipt of said signal $Q_i$;
   fifth means connected to the output of said first means and to the output of said second means for providing to said output terminal a probe signal opposite in type to the last received said $P_i$ or $Q_i$ signals when said signals are detected concomitantly by said first and second means; and
   sixth means connected to the output of said first means and to the output of said second means and adapted to provide a randomly selected $P_o$- or $Q_o$-probe signal to said output terminal when said first and second means fail to detect said $P_1$ or $Q_1$ signals within a predetermined time interval.

2. A probe selector comprising:
   first means for detecting the presence of a signal $P_1$ and for producing a signal $P_i$;
   second means for detecting the presence of a signal $Q_1$ and for producing a signal $Q_i$;
   random timing generator means for producing a Q timing signal and a P timing signal on a mutually exclusive and random basis;
   combining means for detecting the presence of said P timing signal and said Q timing signal and for producing a T timing signal in response thereto;
   first AND gate means responsive to said signal $P_i$ and to said signal T for producing a signal $P_iT$;
   second AND gate means responsive to said signal $Q_i$ and to said signal T for producing a signal $Q_iT$;
   first probe oscillator means for producing a signal A;
   second probe oscillator means for producing a signal B;
   first inverting means responsive to said signal $Q_iT$ for producing a signal $\overline{Q_iT}$;
   second inverting means responsive to said signal $P_iT$ for producing a signal $\overline{P_iT}$;
   first OR gate means responsive to said P timing signal and to said signal $Q_iT$ for producing a signal X;
   second OR gate means responsive to said Q timing signal and to said signal $P_iT$ for producing a signal Y;
   third AND gate means responsive to said signal $\overline{P_iT}$, to said signal X, and to said signal A, for producing a signal $P_o$;
   fourth AND gate means responsive to said signal $\overline{Q_iT}$, to said signal Y, and to said signal B for producing a signal $Q_o$;
   comparator means responsive to said signal $P_i$ and to said signal $Q_i$ for producing a YES signal when $P_i$ occurs before $Q_i$ and for producing a NO signal when $Q_i$ occurs before $P_i$;
   first logic gate means responsive to said signal $P_iT$, to said signal $Q_iT$, to said signal A, and to said YES signal for producing a signal $P_o$;
   second logic gate means responsive to said signal $P_iT$, to said signal $Q_iT$, to said signal B and to said NO signal for producing a signal $Q_o$.

3. The probe selector of claim 2 wherein said first means and said second means both include a pulse stretcher means for producing pulses of predetermined width.

4. The probe selector of claim 3 wherein said first logic gate means and said second logic gate means both include a logic AND gate.

5. The probe selector of claim 2 wherein said comparator means produces said YES signal according to the Boolean function YES = $P_i f_1 f_2$ and produces said No signal according to the Boolean function NO = $Q_i f_1 f_2$, where $F_1 = \overline{P}_i Q_i + P_i f_1$, $F_2 = P\overline{Q}_i + Q_i f_2$ and $f_{1,2}(t) = F_{1,2}(t - \Delta t)$.

6. The probe selector of claim 2 further including an OR gate responsive to said signals $P_o$ and to said signals $Q_o$.

7. In an interrogator-transponder collision avoidance system employing two distinct probe signals, a probe selector, which insures that a transmitted probe is opposite in type to the last received probe, comprising:
   first pulse stretcher means for stretching a received $P_1$-type probe to produce a signal $P_i$;
   second pulse stretcher means for stretching a received $Q_1$-type probe to produce a signal $Q_i$;
   random timing means for producing two mutually exclusive output signals P and Q;
   combining means for combining said P and Q signals in a logical OR fashion to produce a signal T;
   first AND gate means connected to the output of said first pulse stretcher means and to the output of said combining means 44 for producing a signal $P_iT$;

second AND gate means connected to the output of said second pulse stretcher means and to the output of said combining means 44 for producing a signal $Q_iT$;

first OR gate means connected to the output of said second AND gate means and to said P output signal of said random timing means;

second OR gate means connected to the output of said first AND gate means and to said Q-output signal of said random timing means;

third AND gate means connected to the output of said first OR gate means, to the inverted output of said first AND gate means and to the output of a $P_o$-probe oscillator means;

fourth AND gate means connected to the output of said second OR gate means, to the inverted output of said second gate means and to the output of a $Q_o$-probe oscillator means;

third OR gate means connected to the output of said third AND gate means, to the output of said fourth AND gate means, and to the output of a $P_o$ AND gate means and a $Q_o$ AND gate means;

said $P_o$ AND gate means being responsive to the output of said $P_o$-probe oscillator means, to the output of said first AND gate means, to the output of said second AND gate means and to the YES output of a comparator means;

said $Q_o$ AND gate means being responsive to the output of said $Q_o$-probe oscillator means, to the output of said first AND gate means, to the output of said second AND gate means and to the NO output of said comparator means;

said comparator means being responsive to said signal $P_i$ and to said signal $Q_i$ to produce said YES signal when $P_i$ occurs before $Q_i$ and to produce said NO signal when $Q_i$ occurs before $P_i$.

* * * * *